US006245698B1

(12) United States Patent
Pope et al.

(10) Patent No.: US 6,245,698 B1
(45) Date of Patent: Jun. 12, 2001

(54) PROCESS FOR MAKING POROUS CERAMIC COMPOSITES WITH A BIMODAL PORE SIZE DISTRIBUTION

(76) Inventors: Edward J. A. Pope, 447 Lorenzo Dr., Agoura, CA (US) 91301; John D. MacKenzie, 2456 Arbutus Dr., Los Angeles, CA (US) 90049

( * ) Notice: Subject to any disclaimer, the term of this patent is extended or adjusted under 35 U.S.C. 154(b) by 0 days.

(21) Appl. No.: 08/102,470

(22) Filed: Aug. 5, 1993

(51) Int. Cl.[7] .................................................. C03C 14/00
(52) U.S. Cl. ............................ 501/12; 501/99; 501/154
(58) Field of Search .............................. 501/12, 99, 154; 210/510.1; 264/65; 525/477; 528/15, 31

(56) References Cited

U.S. PATENT DOCUMENTS

| | | | |
|---|---|---|---|
| 4,818,732 | * | 4/1989 | Fox et al. ................................ 501/81 |
| 5,215,942 | * | 6/1993 | MacKenzie et al. .................. 501/12 |
| 5,242,866 | * | 9/1993 | Leung et al. .......................... 501/12 |

* cited by examiner

Primary Examiner—John Kim
(74) Attorney, Agent, or Firm—W. Edward Johansen

(57) ABSTRACT

A process for making a porous ceramic composite with a bimodal pore size distribution includes the steps of mixing an organosilicon precursor, an alcohol, water, a catalyst, granules, particles, whiskers or powders of a fumed silica and granules, particles, whiskers or powders of a ceramic material and a combustible material having a diameter in a range of 500 angstroms to 500 microns to form a mixture, pouring the mixture into a mold, allowing the mixture to gel form a ceramic composite and drying the ceramic composite. The process also includes the step of heating the ceramic composite in either air or oxygen to burn away the combustible material. The organosilicon precursor is selected from a group consisting of tetramethoxysilane, tetraethoxysilane, tetrapropoxysilane and tetrabutoxysilane. The alcohol is selected from the group consisting of methanol, ethanol, propanol and butanol.

7 Claims, 2 Drawing Sheets

PROCESS FOR MAKING POROUS CERAMIC COMPOSITES WITH A BIMODAL PORE SIZE DISTRIBUTION

BACKGROUND OF THE INVENTION

The field of the invention is processes for making porous ceramic composites and their use in forming ultrafilters and catalyst supports.

Porous ceramic composites have been used to form ultrafilters and catalyst supports. The ultrafilters separate gases, liquids and particles. The catalyst supports are used for gas and liquid phase reactions.

The porous ceramic material must have a high ratio of surface area to mass and a a high flow rate for a filtered fluid. The high ratio of surface area to mass is achieved through either a thin layer of a ceramic composite having fine interconnected pores. The high flow rate is achieved through a substrate of a ceramic composite having interconnected course pores. The thin layer of a fine porous composite is deposited on top of the courseporous substrate. A high flow rate is achieved by making a fine pore membrane as thin as possible and by applying a high pressure across the membrane.

In a process using a catalyst the catalyst support is formed out a ceramic composite having course pores and fine pores. The catalyst support should be chemically and physcially stable. This requirement of physical and chemical stability makes porous ceramic composites desirable as a catalyst support. The fine pores provide a high ratio of surface area to mass in order to maximize both the contact and the interaction between a fluid, either a gas or a liquid, and the catalyst, such as particles of platinum. The course pores permit the fluid to flow through the catalyst support at a high flow rate.

U.S. Pat. No. 4,981,590 teaches a microfilter which includes a support layer which is formed out of a ceramic composite having course pores and a thin layer which is formed out of a ceramic composite having course pores. The support layer and the thin layer are firmly bound to each other. There is a sharp geometric transition between the support layer and the thin layer. If the thin layer has any pin-holes then the microfilter is ruined.

U.S. Pat. No. 4,689,150 teaches a separation membrane which includes a glassy microporous porous support. The separation membrane has excellent heat resistance, corrosion resistance, durability, gas-separability and high mechanical strength. The separation membrane is preferably provided with a metallic or ceramic microporous membrane vapor-deposited on the surface of the glassy microporous membrane. The separation membrane can be utilized with high efficiency in such diversified fields as either microfiltration or ultrafiltration of fluids, either gases or liquids.

U.S. Pat. No. 4,562,021 teaches a microfilter which includes a support layer of a ceramic composite having interconnected course pores and a thin layer of a ceramic composite having interconnected fine pores. Hydrolysis is performed on an alkoxide, an organo-metallic compound in order to obtain a sol of particles of the oxide. A thickening agent is added to the sol. The resulting sol is slip casted to form the thin layer which is deposited onto the support layer. The thin layer deposited on the support layer is then dried and heat treated to eliminate the thickening agent and to sinter the particles of the deposited thin layer. In Chapter 14, entitled "Ultrafilters by the Sol-Gel Process," of *Ultrastructure Processing of Advanced Ceramics*, published by John Wiley & Sons of New York in 1988, Louis Cot, Andre Larbot amd Christian Guizard have discussed the use of membranes in operations requiring separation.

U.S. Pat. No. 4,874,516 teaches a microfilter which includes a support layer of a ceramic composite having interconnected course pores and being of a high strength. The support layer is covered by and supports a microporous membrane of a polymer, such as a fluorocarbon polymer, which partly permeates the surface of the support layer and which acts as a microfilter for fine particles. The microfilter exhibits excellent corrosion-resistance, durableness and heat-resistance.

U.S. Pat. No. 4,581,126 teaches a catalyst support which includes a porous gel of an inorganic substance, for example a refractory inorganic oxide, and has a surface area in the range 125 to 150 square meters per gram, a mean pore diameter in the range of 140 to 190 angstroms with at least 80% of the pore volume contained in pores having a pore size range of 50 to 90 angstroms.

U.S. Pat. No. 4,969,990 teaches a catalyst which is useful for hydroprocessing a hydrocarbon-containing oil and which contains at least one hydrogenation component on an amorphous, porous refractory oxide. The catalyst is prepared by impregnating support particles having a narrow pore size distribution and a mode pore diameter from about 70 to 80 angstroms with a solution containing a precursor of the hydrogenation components, followed by drying and calcining. The catalyst is useful for promoting a number of hydrocarbon hydroprocessing reactions, hydrogenative desulfurization, demetallization and denitrogenation, and hydrodesulfurization of residuum-containing oils.

SUMMARY OF INVENTION

The present invention is directed to a process for making a porous ceramic composite which includes the step of mixing an organosilicon precursor, an alcohol, water and a catalyst to form a mixture. The process also includes the step of pouring the mixture into a mold, allowing the mixture to gel form a ceramic composite and drying the ceramic composite.

In a first separate aspect of the invention the process also includes the steps of mixing particles of a combustible material having a diameter in a range of 500 angstroms to 500 microns into the mixture and heating the porous ceramic composite in either air or oxygen to burn away the particles of combustible material to produce a porous ceramic composite with a bimodal pore size distribution.

In a second separate aspect of the invention the process also includes the step of mixing granules, particles, whiskers or powders of a fumed silica into the mixture to increase the viscosity of the mixture.

In a third separate aspect of the invention the process also includes the step of mixing granules, particles, whiskers or powders of a ceramic material into the mixture to increase the structural strength of the ceramic composite.

In a fourth separate aspect of the invention a microfilter is formed out of a porous composite with a bimodal pore size distribution.

In a fifth separate aspect of the invention a catalyst support is formed out of a porous composite with a bimodal pore size distribution.

Other aspects and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
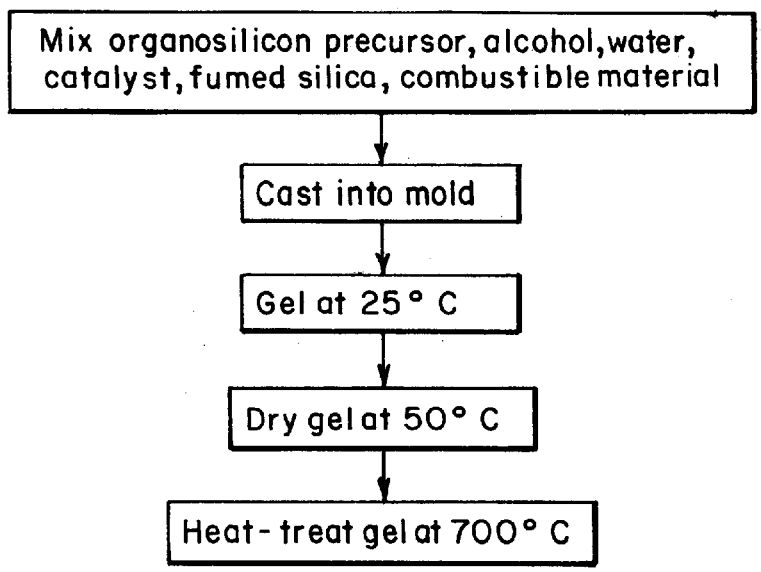
FIG. 1 is a schematic diagram of a process for making a microfilter which is formed out of a porous ceramic composite with a bimodal pore size distribution according to the present invention.
Figure 2:
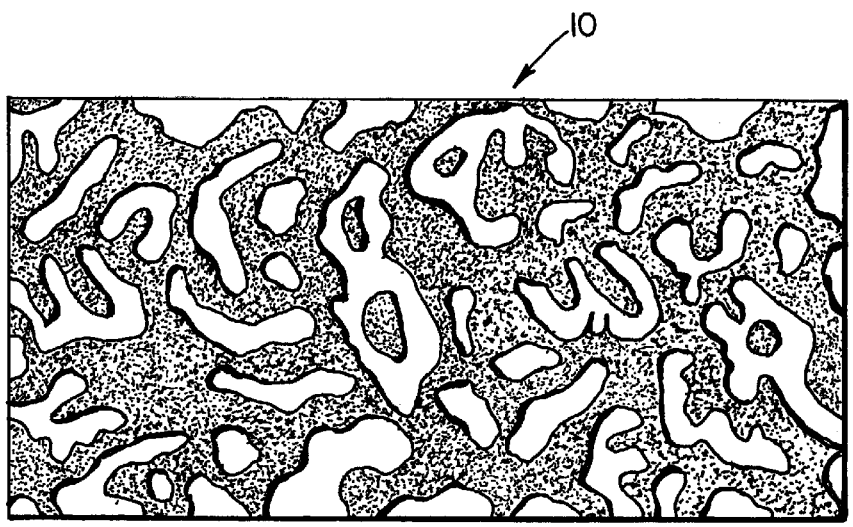
FIG. 2 is a cross-sectional view of a microfilter which is formed out of a porous ceramic composite with a monomodal pore size distribution.

Referring to FIG. 1 in conjunction with FIG. 2 a process for making a microfilter 10 which is formed out of a porous ceramic composite with a monomodal pore size distribution includes the steps of mixing an organosilicon precursor, an alcohol, water, a catalyst, granules, particles, whiskers or powders of a fumed silica and granules, particles, whiskers or powders of a ceramic material to form a mixture, pouring the mixture into a mold, allowing the mixture to gel to form the microfilter 10 and drying the microfilter 10. The microfilter 10 has a plurality of fine pores 11. The porous ceramic composite which is used to form the microfilter 10 can have a surface area as high as 2000 square meters per gram. In their paper, entitled "Novel Composite Materials for Space Structures and Systems," published in *Proceedings of the 32nd International SAMPE Symposium*, Volume 32, pages 760–771, the inventors have described the process for making the porous ceramic composite with a monomodal pore size distribution. The inventors hereby incorporate their above cited article herein by reference.

The organosilicon precursor is selected from a group consisting of tetramethoxysilane, tetraethoxysilane, tetrapropoxysilane and tetrabutoxysilane. The alcohol is selected from the group consisting of methanol, ethanol, propanol and butanol.

The catalyst is selected from a group consisting of HF, HCl, HBr, HI, KF, KCl, KBr, KI, $HNO_3$, $H_2SO_4$, HOAce, $NH_3OH$, $NH_4OH$ and $NH_4Cl$. In their above cited article, entitled "Sol-Gel Processing of Silica II, The Role of the Catalyst," the inventors have discussed all of these catalysts and hereby incorporate their above cited article herein by reference.

The addition of the granules, particles, whiskers or powders of fumed silica increases the viscosity of the mixture. The organosilicon precursor and the water are miscible in the alcohol. The water in the mixture hydrolizes the organosilicon precursor to form the microfilter 10.

In their article, entitled Sol-Gel Processing of Silica II, The Role of the Catalyst, published in the *Journal of Non-Crystaline Solids*, Volume 87 (1986), pages 185–198, the inventors discussed their utilization of a mixture of an organosilicon precursor, an alcohol, water and a catalyst in the sol-gel processing of silica. When they varied the catalysts they observed dramatic effects on gelation time, porosity, bulk and apparent denisity and volume shrinkage on drying. They obtained porosities in the range from two to sixty eight percent for dried and fired gels. The inventors hereby incorporate their above cited article herein by reference.

In their article, entitled "Porous and Dense Composites from Sol-Gel," published in *Tailoring Multiphas and Composite Ceramics, Material Science Research*, Volume 20, pages 187–194, the inventors described that the addition of the granules, particles, whiskers or powders of a ceramic material which act as an insert filler increases the structural strength of the ceramic filter. In processing silica the ceramic material which may be a silicon carbide powder is dispersed in silica gel thereby rendering a porous silicon carbide-silica composite. The porous ceramic composites may also be prepared by using one of the other systems which follow, namely, $SiC$—$SiO_2$, $SiO_2$—$Al_2O_3$, $SiO_2$—$Si_3N_4$, $SiO_2$—$TiC$, $SiO_2$—$Al$, $SiO_2$—$SiO_2$ microspheres, $SiO_2$-fumed $SiO_2$. The inventors hereby incorporate their above cited article herein by reference.

In their article, entitled "Oxide-Nonoxide Composites by Sol-Gel," published in *Better Ceramics through Chemistry II, Material Research Society Symposium Proceedings*, Volume 73, pages 809—814, the inventors described the process of making a light-weight, triphasic composite which includes the step of impregnating a polymer into of a porous gel composite. The light-weight, triphasic composite possesses good abrasion resistence and high fracture ductility. The inventors hereby incorporate their above cited article herein by reference.

Figure 3:
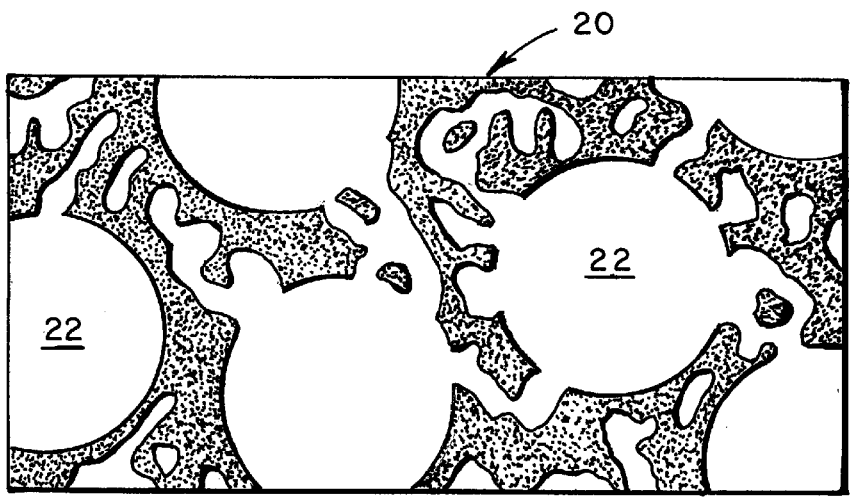
FIG. 3 is a cross-sectional view of the microfilter of FIG. 1.

Referring to FIG. 1 in conjunction with FIG. 3 a process for making a microfilter 20 which is formed out of a porous ceramic composite with a bimodal pore size distribution includes the steps of mixing an organosilicon precursor, an alcohol, water, a catalyst, granules, particles, whiskers or powders of a fumed silica, granules, particles, whiskers or powders of a ceramic material and particles of a combustible material having a diameter in a range of 500 angstroms to 500 microns to form a mixture, pouring the mixture into a mold, allowing the mixture to gel to form the microfilter 20 and drying the microfilter 20. The combustible material may be either large organic molecules, such as ethyl cellulose, or large organic or carbon containing particles, such as acrylic polymer beads, fine sawdust or graphite.

The addition of the granules, particles, whiskers or powders of fumed silica increases the viscosity of the mixture. The organosilicon precursor and the water are miscible in the alcohol. The water in the mixture hydrolizes the organosilicon precursor to form the microfilter 20.

Still referring to FIG. 1 in conjunction with FIG. 3 the process also includes the step of heating the catalyst support in either air or oxygen to burn away the particles of the combustible material. The microfilter 20 has a plurality of fine pores 21 with a diameter in a range of 20 to 500 angstroms and a plurality of course pores 22 with a diameter in a range of 500 angstroms to 500 microns. The fine pores 21 are interconnected to each other and the course pores 22 are isolated from each other, but are interconnected by fine pores 21. The microfilter 20 has a surface area of approximately 300 square meters per gram.

Figure 4:
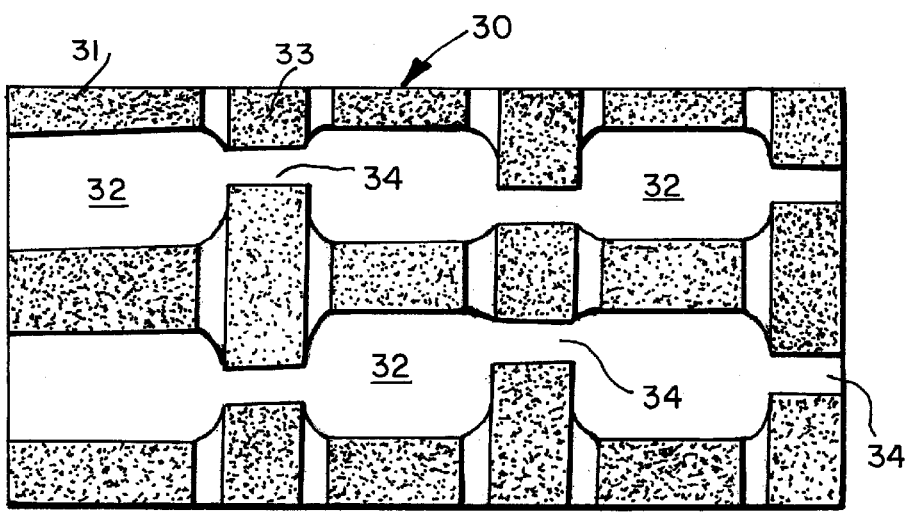
FIG. 4 is a schematic drawing of a cross-sectional view of a microfilter which is an analog to the microfilter of FIG. 1.

Referring to FIG. 4 a microfilter 30 is an analog to the microfilter 20. The microfilter 30 includes a plurality of support layers 31 of a ceramic composite having interconnected course pores 32 and a pluralty of thin layers 33 of a ceramic composite having interconnected fine pores 34. Each thin layer 33 is deposited on one of the support layers 31 according to U.S. Pat. No. 4,562,021.

Figure 5:
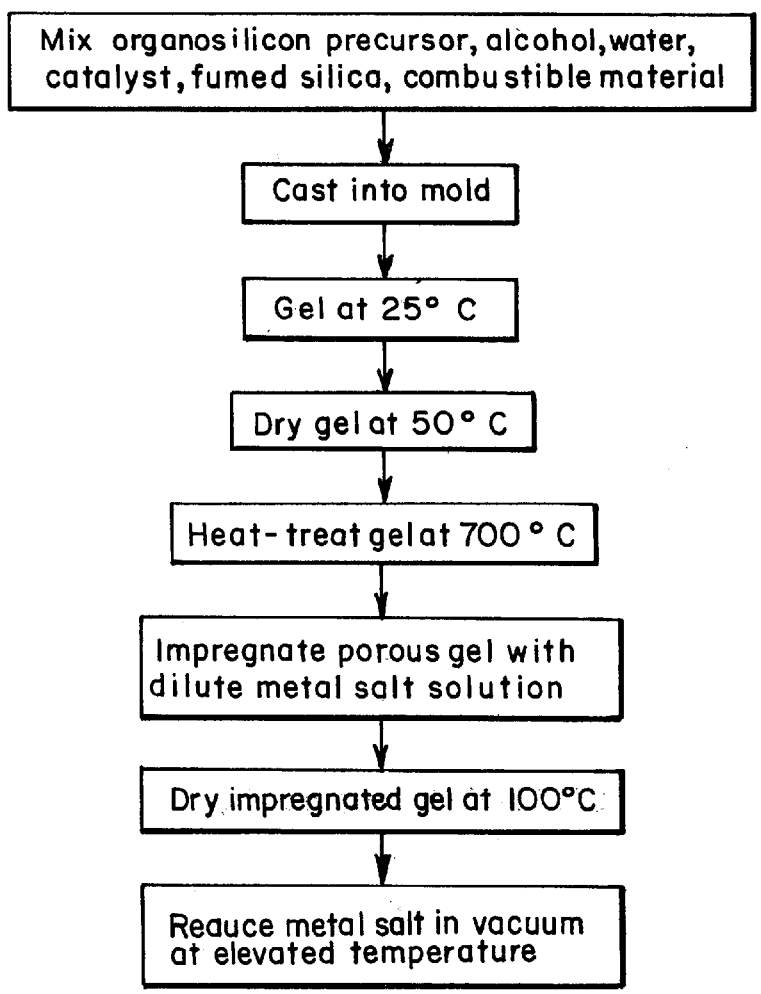
FIG. 5 is a schematic diagram of a process for making a catalyst support which is formed out of a porous ceramic composite with a bimodal pore size distribution and introducing a catalyst into the catalyst support according to the present invention.

Referring to FIG. 5 a process for making a catalyst support with a bimodal pore size distribution includes the steps of mixing an organosilicon precursor, an alcohol, water, a catalyst, particles of a fumed silica, granules of a ceramic material and particles of a combustible material to form a mixture, allowing the mixture to gel form a catalyst support and drying the ceramic filter. The process also includes the step of heating the catalyst support in either air or oxygen to burn away the particles of the combustible material. The process for introducing a catalyst into the catalyst support with a bimodal pore size distribution further includes the steps of impregnating the catalyst support with a dilute metal salt solution, drying the impregnated catalyst support and heating the impregnated catalyst support in a vacuum at an elevated temperature thereby reducing the metal salt.

Still referring to FIG. 5 the catalyst support is formed out of a porous ceramic composite which has a plurality of fine pores with a diameter in a range of 20 to 500 angstroms and a plurality of course pores 32 with a diameter in a range of 500 angstroms to 500 microns. The fine and course pores are interconnected to each other.

From the foregoing it can be seen that a process for making porous ceramic composites with a bimodal pore size distribution has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A process for making a porous ceramic composite with a bimodal pore size distribution comprising the steps of:
    a. mixing an organosilicon precursor from a group consisting of tetramethoxysilane, tetraethoxysilane, tetrapropoxysilane and tetrabutoxysilane, water, a catalyst and particles of a combustible material having a diameter in a range of 500 angstroms to 500 microns to form a mixture;
    b. pouring said mixture into a mold;
    c. allowing said mixture to gel to form a ceramic composite;
    d. drying said ceramic composite; and
    e. heating said ceramic composite in either air or oxygen to burn away said particles of said combustible material.

2. A process for making a porous ceramic composite with a bimodal pore size distribution according to claim 1 wherein said process includes the step of adding an alcohol from the group consisting of methanol, ethanol, propanol and butanol to said mixture.

3. A process for making a porous ceramic composite with a bimodal pore size distribution according to claim 1 wherein said process includes the step of adding granules, particles, whiskers or powders of a fumed silica to said mixture.

4. A process for making a porous ceramic composite with a bimodal pore size distribution according to claim 1 wherein said process includes the step of adding granules, particles, whiskers or powders of a ceramic material to said mixture.

5. A process for making a ceramic filter with a bimodal pore size distribution comprising the steps of:
    a. mixing an organosilicon precursor from a group consisting of tetramethoxysilane, tetraethoxysilane, tetrapropoxysilane and tetrabutoxysilane, an alcohol from the group consisting of methanol, ethanol, propanol and butanol, water, a catalyst, granules, particles, whiskers or powders of a fumed silica, granules, particles, whiskers or powders of a ceramic material and particles of a combustible material having a diameter in a range of 500 angstroms to 500 microns to form a mixture;
    b. pouring said mixture into a mold;
    c. allowing said mixture to gel form a ceramic filter;
    d. drying said ceramic filter; and
    e. heating said ceramic filter in either air or oxygen to burn away said particles of said combustible material.

6. A process for making a catalyst support with a bimodal pore size distribution comprising the steps of:
    a. mixing an organosilicon precursor from a group consisting of tetramethoxysilane, tetraethoxysilane, tetrapropoxysilane and tetrabutoxysilane, an alcohol from the group consisting of methanol, ethanol, propanol and butanol, water, a catalyst, granules, particles, whiskers or powders of a fumed silica, granules, particles, whiskers or powders of a ceramic material and particles of a combustible material having a diameter in a range of 500 angstroms to 500 microns to form a mixture;
    b. pouring said mixture into a mold;
    c. allowing said mixture to gel form a catalyst support;
    d. drying said catalyst support; and
    e. heating said catalyst support in either air or oxygen to burn away said particles of said combustible material.

7. A process for introducing a catalyst into a catalyst support with a bimodal pore size distribution according to claim 6 wherein said process comprises the steps of:
    a. impregnating said catalyst support with dilute metal salt solution;
    b. drying said impregnated catalyst support; and
    c. heating said impregnated catalyst support in a vacuum at an elevated temperature thereby reducing said metal salt.

* * * * *